US008797233B2

(12) United States Patent  (10) Patent No.: US 8,797,233 B2
Jenks et al.  (45) Date of Patent: Aug. 5, 2014

(54) SYSTEMS, METHODS, AND DEVICES FOR DYNAMIC MANAGEMENT OF DATA STREAMS UPDATING DISPLAYS

(75) Inventors: Stephen F. Jenks, Irvine, CA (US); Sung-Jin Kim, Irvine, CA (US)

(73) Assignee: The Regents of The University of California, Oakland, CA (US)

( * ) Notice: Subject to any disclaimer, the term of this patent is extended or adjusted under 35 U.S.C. 154(b) by 1448 days.

(21) Appl. No.: 12/487,590

(22) Filed: Jun. 18, 2009

(65) Prior Publication Data

US 2010/0045594 A1  Feb. 25, 2010

Related U.S. Application Data

(60) Provisional application No. 61/090,581, filed on Aug. 20, 2008.

(51) Int. Cl.
*G09G 5/00* (2006.01)
*H04N 7/18* (2006.01)

(52) U.S. Cl.
USPC ............................................. 345/1.3; 725/82

(58) Field of Classification Search
USPC ............ 345/1.1–3.4; 709/217–219, 227–229; 725/74, 78, 82, 83
See application file for complete search history.

(56) References Cited

U.S. PATENT DOCUMENTS

| 5,523,769 A * | 6/1996 | Lauer et al. ..................... 345/1.3 |
| 6,344,836 B1 * | 2/2002 | Suzuki ............................ 345/2.1 |
| 6,614,439 B2 * | 9/2003 | Matsumoto et al. .......... 345/530 |
| 8,117,314 B2 * | 2/2012 | Croft et al. ..................... 709/227 |
| 2008/0228923 A1 * | 9/2008 | Chidambaran et al. ....... 709/227 |
| 2012/0139840 A1 * | 6/2012 | Day et al. ...................... 345/163 |

* cited by examiner

*Primary Examiner* — Joe H Cheng
*Assistant Examiner* — Steven Holton
(74) *Attorney, Agent, or Firm* — Knobbe, Martens, Olson & Bear, LLP (57) ABSTRACT

Presented herein are methods, systems, devices, and computer-readable media for systems for dynamic management of data streams updating displays. Some of the embodiments herein generally relate to presenting video image data on an array of tiled display units, thereby allowing the display of much larger images than can be shown on a single display. Each display unit can include a video image display, a communication mechanism, such as a network interface card or wireless interface card, and a video image controller, such as a graphics card. Attached to the tiled display may be one or more user computers or other sources of video image data. A workstation may also be coupled to the tiled display and to the user computers. Each of the user computers can display data or images on the tiled display simultaneously. Since the tiled display is made up of multiple display units, the images from a single user computer may be on multiple, separate individual display units. The images from multiple user computers could also be shown on the same display unit and they may even overlap.

35 Claims, 6 Drawing Sheets

SYSTEMS, METHODS, AND DEVICES FOR DYNAMIC MANAGEMENT OF DATA STREAMS UPDATING DISPLAYS

PRIORITY INFORMATION

The present application is based on and claims priority U.S. Provisional Patent Application No. 61/090,581 filed on Aug. 20, 2008, the entire contents of which is expressly incorporated by reference herein.

BACKGROUND OF THE INVENTIONS

1. Field of the Inventions

The present inventions relate to large display systems, and more particularly, to large display systems formed of an array of tiled display units.

2. Description of the Related Art

Traditionally, personal computers and workstations are connected to one or a small number of adjacent display devices, often LCD type monitors. Such systems can provide the user with the ability to view a larger number of pixels than that typically displayable on a single monitor. 0

Commercially available computer systems can often support one or two monitors for each video controller (sometimes constructed in the form of a "video card") connected to the system. For example, typical "PC" computer systems include several "expansion slots" which can accept certain types of video cards. Motherboards of some "PCs" are built with one or more PCI, PCI Express, AGP, etc., slots that can accept video cards. In this manner, a single computer can be provided with multiple video cards to increase the number of displays that can be controlled by the computer.

SUMMARY OF THE INVENTIONS

An aspect of at least one of the inventions disclosed herein includes the realization that, although a single computer system (a computer system controlled by a single "motherboard" which may have one or more processors) can be connected with an array of display devices, the processing core of such a computer system can become a choke point which ultimately limits the performance and thus the practicability of creating and controlling video images on tiled arrays formed of a large number of individual display devices disposed adjacent one another. Thus, in some of the embodiments disclosed herein, each display device or "node" in a tiled array display can include a network communication device configured to allow the node to receive image data from a video image data source without all of the video image data for the entire array passing through a single computer.

Thus, in accordance with an embodiment, a method of presenting video image data on an array of tiled display units, wherein each of the tiled display units comprising a video display and a network communication module, a primary workstation communicating with the tiled display units over a network and at least a first video image data source connected to the network so as to communicate with the primary workstation and the tiled display units, can comprise transferring a first video image data from the at least one video image data source to the primary workstation. The method can also include transferring the first video image data from the primary workstation to a first portion of the array of tiled display units, the first portion of the array of tiled display units comprising a first portion of a first video display of at least a first tiled display unit, creating a first communication connection between the network communication module of the first tiled display unit and the video image data source, and transferring a second video image data from the first video image data source over the communication connection to the first portion of the array of tiled display units, without all of the second video image data first passing through the primary workstation.

In accordance with another embodiment, a tiled video display system can comprise an array of display units comprising at least first and second display units, the first display unit comprising a first video image display device, a first video image controller, and a first network communication device, the second display unit comprising a second video image display device, a second video image controller, and a second network communication device. The display system can also include wherein the first and second video image controllers are configured to designate first and second discrete portions of the first and second video image display devices, respectively, and to independently receive first and second portions of a single video image from a video image data source over a network, and to display the first and second portions of the single video image on the first and second discrete portions, respectively.

In accordance with yet another embodiment, a video display device can comprise a video image display including a plurality of display pixels, a network communication device, and a video controller configured to designate a video image area including all or a limited portion of the display pixels for displaying a portion of a video image received from a video image source communicating with the network communication device over a network.

In accordance with a further embodiment, a display system can comprise an array of display units comprising at least first and second display units, the first display unit comprising a first video image display device and a first network communication device, the second display unit comprising a second video image display device and a second network communication device. A primary workstation can be configured to communicate with the first and second network communication devices, and a video image data source can communicate with the first and second network communication devices over a network. The primary workstation can be configured to determine communication parameters for direct communication between the first and second network communication devices and the video image data source, the primary workstation being further configured to transmit the communication parameters to the first and second display units, and wherein the first and second network communication devices are configured to communicate with the video image data source using the communication parameters provided by the primary workstation.

In accordance with another embodiment, a method of displaying an image on a subset of an array of a plurality of connected displays to which a user computer is also connected, can comprise determining which of one or more connected displays, chosen from the plurality of displays connected to the user computer, should be sent updated image data and establishing a direct connection between the one or more connected displays and an image data source remote from the user computer. The method can also comprise receiving the updated image data at the one or more connected displays over the direct connections between the one or more displays and the image data source and updating the one or more connected displays with the updated image data.

In accordance with a further embodiment, a method of presenting data from a user computer to a subset of two or more connected displays to which the user computer is also connected, can comprise determining which one or more connected displays, chosen from among the two or more connected displays, should receive updated display data from the user computer. The method can also comprise establishing a connection between the user computer and each of the one or more connected displays, when data is generated at the user computer that affects display, receiving that display update only at the one or more connected displays, and when communicated data is received at the one or more connected displays, updating the one or more connected displays based on that data.

BRIEF DESCRIPTION OF THE DRAWINGS

The above-mentioned and other features of the inventions disclosed herein are described below with reference to the drawings of preferred embodiments. The illustrated embodiments are intended to illustrate, but not to limit the inventions. The drawings contain the following Figures.

DETAILED DESCRIPTION OF SPECIFIC EMBODIMENTS

The present disclosure generally relates to array-type displays and manipulation of a large image, a stream of visual data, or the like on an array-type display, such as a tiled display system. In some embodiments, a system that implements a highly interactive large image or parallel display system can be used. In contrast to existing frameworks where unnecessary parts of images are displayed or loaded in the memory of a display node, some embodiments of the present systems can calculate limited portions of images to be displayed on a particular display node. This advantageously reduces the amount of data to be loaded on a particular display node, and thus increases the responsiveness of the overall tiled display. The system can thus allow updating and/or movement of images around the tiled display at a faster rate.

Additionally, some embodiments disclosed herein can allow panning, zooming, rotating, color filtering, transparency controlling, and the like of images and other visual data, including streaming data, on the tiled display, as well as other functions. Some of the embodiments described below can accommodate viewing of multiple highly detailed images, which can exceed billions of pixels, to be displayed as part of a high resolution, coordinated workspace on a tiled display. The in real-time or in near real-time interaction with the multiple image data, which can be received from multiple image data sources, can include moving, zooming, rotating, color filtering, and transparency control of the images more quickly. Thus the system can be beneficial for viewing or visualizing various types of data, such as medical, cancer cells, satellite, geosciences, oil monitoring, weather monitoring or prediction, astronomy, and the like.

Embodiments are described below with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the inventions may include several novel features, no single one of which is solely responsible for its desirable attributes or which is essential to practicing the inventions herein described.

Also presented herein are methods, systems, devices, and computer-readable media for systems for dynamic management of data streams updating displays. Some of the embodiments herein generally relate to presenting video image data on a tiled array of display units, thereby allowing the display of much larger images than can be shown on a single display. Each such display unit can include a video image display, a communication mechanism, such as a network interface card or wireless interface card, and a video image controller, such as a graphics card. Attached to the tiled display may be one or more computers or other sources of video image data. A workstation may also be coupled to the tiled display and to the user computers. Each of the computers can display data or images on the tiled display simultaneously. Since the tiled display is made up of multiple display units, the images from a single user computer may be on multiple, separate individual display units. The images from multiple user computers could also be shown on the same display unit and can overlap.

In some embodiments, initial connections between the a source of image data and the tiled display can be established through a "local workstation", for example, a computer disposed in front of the tiled array. As such, a user can operate the primary workstation to control the tiled display. In other embodiments, one of the "nodes" of the tiled display can serve as the a controlling node with input devices, such as mice and keyboards, connected thereto for allowing a user to control the placement and manipulation of images on the tiled display.

As described in more detail below, individual display units in the tiled display can subscribe to or connect to the image source, or vice versa, and therefore information can travel directly from the image source to the designated display unit or "node" of the tile display. This can technique can be used to reduce the amount of bandwidth needed and the amount of computation required for each display unit.

Additionally, in some embodiments, user interaction devices such as a mouse or keyboard coupled to a workstation or another other client device and can be used to manipulate or interact with images that are displayed on the tiled display. This interaction data is sent to the corresponding client for updating its display device as well as the related display units or "nodes" of the tile display. Such systems and methods can be useful when a user desires to display an image that is larger than a traditional display connected to a user computer can handle.

The systems and methods described herein, along with the associated Figures, illustrate example operating environments of use. As will be described in greater detail below, these systems and methods may be implemented using computing devices other than display devices. To illustrate, in certain embodiments, the systems and methods generally provide functionality for a computing device to broker network communications between two other computing devices. For example, a control computing device could broker a connection between a media server and a destination computing device, which may be a display. Advantageously, in certain embodiments, the destination computing device and the media source device can communicate without passing any or all communication through the control computing device.

Figure 1:
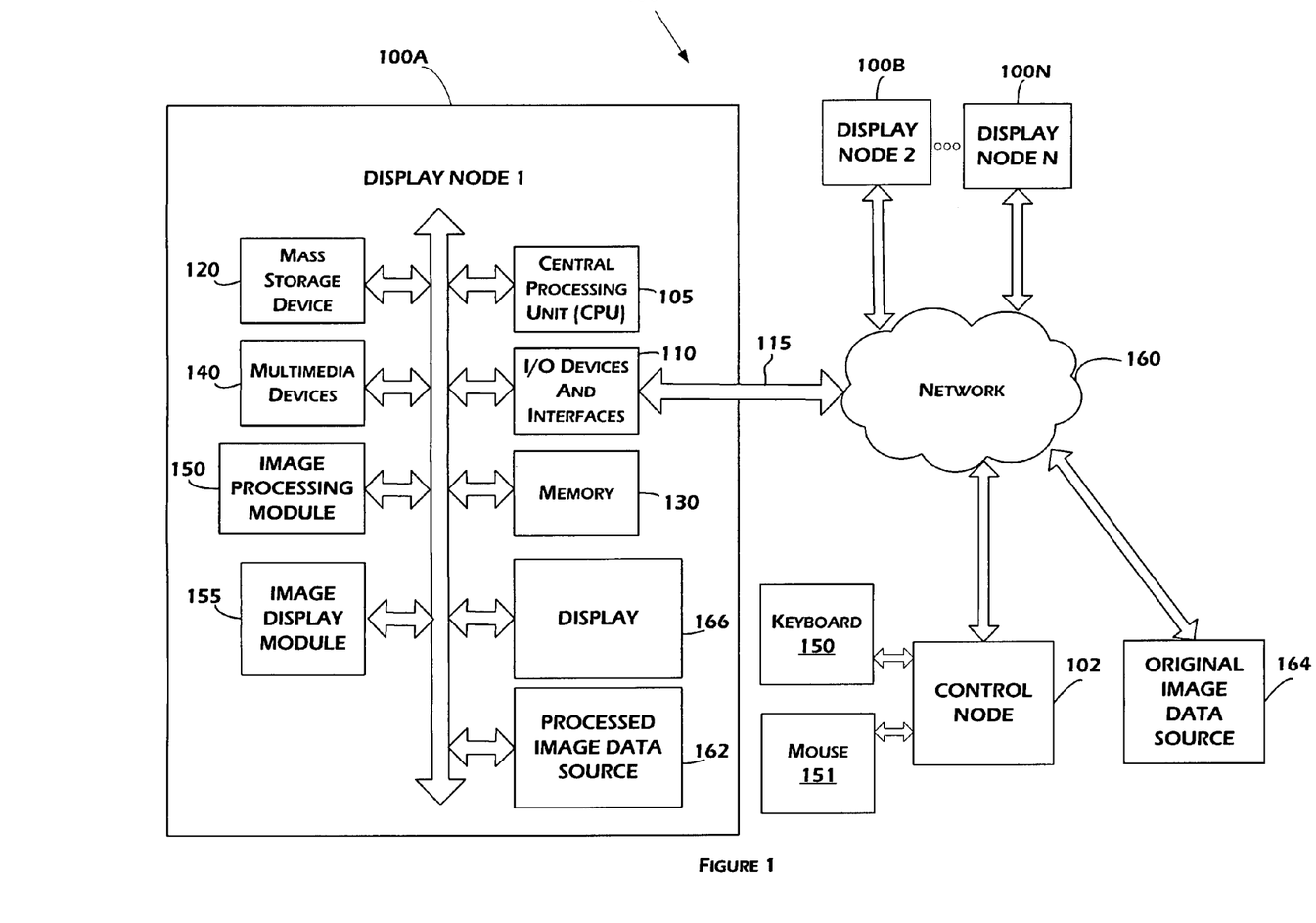
FIG. 1 is a schematic diagram illustrating an embodiment of a system for dynamic management of data streams of image data to a display array.

FIG. 1 is a block diagram showing of a plurality of display nodes 100A (including display nodes 100A, 100B, and 100N that are representative of any quantity of display nodes) that are in communication with a network 160 and other devices via the network 160, including an optional control node 102, which can also be referred to as a primary workstation in some embodiments. Visual data, such as video image data discussed below, can be stored in any device connected to the network, including the nodes 100N, the control node 102, or any other device. In some embodiments, original image data source 164 can be a mass storage device or computing system, also in communication with the network 160.

Generally, the control node 102 can comprise one or more computing devices that gather or make available information about the state of the overall tiled display system 100, including display nodes 100, through the use of messages. For example, the control node 102 can include a desktop, laptop, tablet, netbook, handheld computing device (e.g., a smartphone or PDA), a server, or the like. In addition, the control node 102 can function as a front end interface to the tiled display system 100 that allows a user to interact with the overall system 100 by manipulating the parallel display, for example.

Any of the display nodes 100N and control node 102 can be used to implement certain systems and methods described herein. For example, in some embodiments, the display node 100A and control node 102 can be configured to manage the display of information on tiled display systems. The functionality provided for in the components and modules of the display node 100A and control node 102 can be combined into fewer components and modules or further separated into additional components and modules.

In some embodiments, the display node 100A can include, for example, a computing device, such as a personal computer that is IBM, Macintosh, or Linux/Unix compatible. In some embodiments, the computing device comprises a server, a laptop computer, a cell phone, a personal digital assistant, a kiosk, or an audio player, for example.

With continued reference to FIG. 1, although only exemplary components of the display node 100A are described in detail, it is to be understood that the descriptions of the display node 100A set forth herein also apply to the other nodes 100B, 100N.

In some embodiments, the display node 100A can include a central processing unit ("CPU") 105, which can include one or more microprocessors, graphics processors, digital signal processors, or the like. The display node 100A can further include a memory 130, such as random access memory ("RAM") for temporary storage of information and a read only memory ("ROM") for permanent storage of information, and a mass storage device 120, such as one or more hard drive, diskette, and/or optical media storage device. Typically, the modules of the display node 100A are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The display node 100A can be controlled and coordinated by operating system software, such as Windows 95, Windows 98, Windows NT, Windows 2000, Windows XP, Windows Vista, Linux, SunOS, Solaris, a real-time operating system (RTOS), or other compatible operating systems. In Macintosh systems, the operating system may be any available operating system, such as MAC OS X. In other embodiments, the display node 100A can be controlled by a proprietary operating system. The operating systems can control and schedule computer processes for execution, perform memory management, provide file system, networking, and I/O services, and provide a user interface, such as a graphical user interface ("GUI"), among other things.

The exemplary display node 100A can include one or more commonly available input/output (I/O) devices and interfaces 110, such as a keyboard, mouse, touchpad, and printer. In addition, display node 100A can include one or more display devices 166, such as a monitor, that allows the visual presentation of data, such as the image data described herein, to a user. More particularly, a display device provides for the presentation of scientific data, GUIs, application software data, and multimedia presentations, for example. The display node 100A can also include one or more multimedia devices 140, such as speakers, video cards, graphics accelerators, and microphones, for example.

In some embodiments, the I/O devices and interfaces 110 can provide a communication interface to various external devices. The display node 100A can be coupled to a network 160 that comprises one or more of a LAN, WAN, or the Internet, for example, via a wired, wireless, or combination of wired and wireless, communication link 115. The network 160 communicates with various computing devices and/or other electronic devices via wired or wireless communication links.

In the embodiment of FIG. 1, display node 100A can include, or may be coupled to via a network connection, to a processed image data source 162, such as a database, that includes information about one or more images to display. The information supplied by the processed image data source 162 can include a full size or original image that was or will be preprocessed and stored in a hierarchical format that includes sub-images, with each sub-image being a reduced size version of the original image. For example, a reduced resolution sub-image can be generated from an original full resolution image by deleting rows and columns of the pixels of the original image at predetermined spacings, thereby generating a lower resolution version of the full image. Any other known technique can also be used. The processed image data source 162 can serve as a video image data source, as used in the description set forth herein.

In some embodiments, the largest sub-image can be the same size as the original image and/or include image content from the original image. For example, each sub-image can be stored as one or more blocks to allow rapid access to a particular part of the original image without having to access entire rows. Of note, this can allow display node 100A to fetch exactly the level of detail (sub-image) it requires and/or to quickly fetch the needed blocks that make up the image tile to be placed on display 166. In addition to the devices that are illustrated in FIG. 1, display node 100A can be connected to original image data source 164 or computing devices through a bus or network 160.

Original image data source 164 can include one or more original or full size images that can be tens or hundreds of millions of pixels, or even billions of pixels. In some embodiments, display node 100A can preprocess the original images stored in original image data source 164, store the result in a hierarchical format in processed image data source 162, calculate the correct portion of original images to be displayed on a particular display node 100, and/or display the corresponding preprocessed image data. Thus, the processed image data source 162 can be used to reduce the amount of data that needs to be loaded in memory and support faster manipulation of images.

Of note, the original images stored in original image data source 164 can be compressed or uncompressed images. In some embodiments, the processed image data source 162 can also be configured to receive a compressed image from the original image data source 164. Once received, display node 100A can decompress an original image and then preprocess the original image into a set of one or more images that are compressed or decompressed and store them in the processed image data source 162. Spatial identifiers can be used to identify various portions of the images to facilitate extraction of different regions of the original image.

In some embodiments, one or more of the data sources may be implemented using a relational database, such as Sybase, Oracle, CodeBase and Microsoft® SQL Server as well as other types of databases such as, for example, a flat file database, an entity-relationship database, an object-oriented database, and/or a record-based database.

With continued reference to FIG. 1, in some embodiments the display node 100A can also include application modules that can be executed by the CPU 105. In some embodiments, the application modules include the image processing module 150 and image display module 155, which are discussed in further detail below. These modules can include, by way of example, hardware and/or software components, such as software components, object-oriented software components, class components and task components, processes, functions, attributes, procedures, subroutines, segments of program code, drivers, firmware, microcode, circuitry, data, databases, data structures, tables, arrays, and variables.

In some of the embodiments described herein, each display node 100A can be configured to execute instructions in the image processing module 150, among others, in order to support user interactivity by reducing the amount of data loaded into memory when an image is to be displayed on the tiled display system. In addition, image processing module 150 can be configured to allow portions of several images to be resident on each display 166, thus supporting display and manipulation of multiple big or original images across multiple display nodes 100. For example, in some embodiments, an original image can be tens of billions of pixels. Image processing module 150 can preprocess and store in a hierarchical format multiple full size or original images by calculating the correct portion of the original images to be displayed on a specific display node 100.

In certain embodiments, each original image can be stored in a hierarchical format that includes sub-images that can be reduced size or reduced resolution versions of the original image. In some embodiments, the largest sub-image can be the same size as the original image and/or include image content from the original image to support zoom in and/or out, for example. Image processing module 150 can then store each sub-image of the original image as one or more blocks to allow rapid access to a particular part of the full size image without having to access entire rows or columns. This can advantageously allow a display node 100A that knows which portion of the original image is needed for its display 166 to fetch the level of detail needed, such as a sub-image and/or to quickly fetch the needed blocks that make up the image tile.

Image processing module 150 can be further configured to send requests to control node 102 for information about other display nodes (e.g., 100B, 100c, etc.) and/or vice versa. In some embodiments, messages can be exchanged between control node 102 and/or other display nodes that include information about the state of the aggregate tiled display, or a particular display node 100A, 100B, 100C, etc. The image processing module 150 and/or the control node 102 may communicate the messages using a web service or using proprietary protocols.

Display node 100A can also execute instructions in image display module 155 to display one or more images or portions thereof and manipulate the images. As noted above, an original image that is full size can be preprocessed by image processing module 150 and then stored in processed image data source 162. Because the amount of data loaded into memory 130 can be reduced when an original image is stored in hierarchical format, image display module 155 can enable a highly interactive display space that spans multiple display nodes 100.

For example, image display module 155 can load the appropriate sub-image of an original image in memory 130 and on display 166. In some embodiments, surrounding blocks and blocks from higher and lower levels can also be pre-fetched for higher performance by image display module 155. This may allow each display node 100A to support the display of more than one such image or portions thereof. Additionally, a resource management approach can support interactivity by reducing the amount of data loaded and allowing portions of several images to be resident on each tile, thus supporting display and manipulation of multiple big images.

Advantageously, image display module 155 can be configured to allow the use of multiple highly detailed image data, which can exceed billions of pixels, to be displayed as part of a high resolution, coordinated workspace on a tiled display that includes multiple display nodes 100. Further, image display module 155 allows in real-time or in near real-time interaction with multiple images by allowing moving, zooming, rotating, color filtering, and transparency controlling of images on display node 100.

For example, in some embodiments, the user may use a front end interface, such as control node 102, and select to rotate an image on the tiled display system. Image display module 155 can respond to the user's selection, by using a reduced size or reduced resolution version of the original image, which may be stored in the processed image data source 162, to quickly adjust its display 166. For example, when the image on the system is initially selected for rotation, the image display module 155 can replace the image being displayed with the reduced size or reduced resolution version during the rotation process. Plus, as the reduced size or reduced resolution version of the original image is rotated and thus redrawn at different angular orientations, less processing power is required to complete the redraw process, thereby providing a quicker response time.

In addition, image display module 155 may also exchange messages with control node 102 or other display nodes 100A about the state of the tiled display, such as which portion of the original image are to be displayed by respective nodes. Thus image display module 155 can provide a highly interactive experience that has numerous applications, including the manipulation of data about medical conditions, cancer cells, satellite images, geosciences, oil monitoring, weather monitoring or prediction, astronomy, video gaming, and the like.

Although FIG. 1 has been described with respect to display nodes 100, a control node 102, and an image data source 164, certain of the features of the system shown in FIG. 1 can be implemented using other types of computing devices communicating over the network 160. For example, the control node 102 can communicate over the network 160 with a media source device (instead of the image data source 164) and one or more destination computing devices (instead of the display nodes 100).

The control node 102 can broker a connection between the media source device and a destination computing device. In one embodiment, the control node 102 locates media data stored on the media source device and obtains the media data or a portion thereof (such as a thumbnail) from the media source device. The control node 102 may then send the media data or the portion thereof to the destination computing device, along with network communication or connectivity data. The network communication data can enable the destination computing device to communicate with the media source device to obtain media data. The network communication data could include, for example, a network address (such as an IP address) of the media source device, a proxy for the media source device, an anycast IP address for a plurality of media source devices, or the like.

Advantageously, in certain embodiments, providing the network communication data from the control node 102 to the destination computing device enables the destination computing device to obtain media, including media updates, from the media source device. As a result, the control node 102 can be less of a bottleneck for communications between the media source device and the destination computing device.

In an embodiment, the destination computing device can report or otherwise provide the media updates it receives or a portion thereof to the control node 102. For example, the destination computing device can provide a thumbnail, a reduced frame rate video, metadata associated with the media updates, combinations of the same, and the like. The control node 102 can therefore keep track of the media data provided to the destination control device.

In another embodiment, the control node 102 can provide network communication information to the media source device instead of or in addition to providing communication information to the destination computing device. This network communication information can allow the media source device to communicate with the destination computing device. For example, the control node 102 can provide a network address of the destination computing device to the media source device. The media source device can then push media to the destination computing device.

In still another embodiment, the control node 102 can identify media stored on the media computing device without requesting the media. The control node 102 can provide network communication data to the destination computing device, which allows the destination computing device to obtain the media from the media server. Thus, little or no media might pass through the control node 102 from the media source device to the destination computing device, further reducing bottleneck effects of the control node 102.

Figure 2:
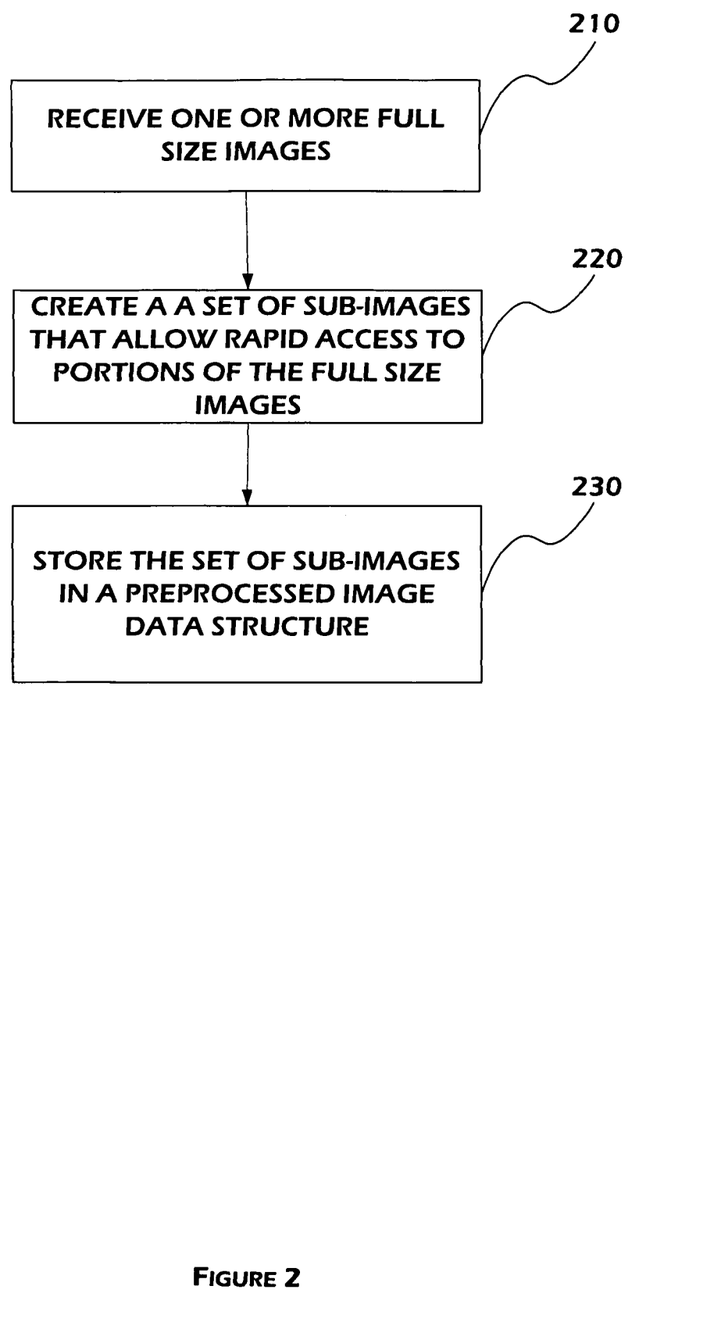
FIG. 2 is a flow chat illustrating an embodiment of a method for displaying an image on an array display.

FIG. 2 is a flowchart illustrating an embodiment of a method of preprocessing images that can provide a high level of interaction and manipulation of the images on tiled display systems. The method illustrated in FIG. 2, as well as the other methods disclosed below, can be stored as process instructions (for example on any type of computer-readable storage medium) accessible by the image processing module 150 and/or other components of the display node 100A, the control node 102, or any other computer or system connected to the array 100 directly or over any type of network. Depending on the embodiment, certain of the blocks described below may be removed, others may be added, and the sequence of the blocks may be altered.

Beginning in block 210, one or more full size images are received. In some embodiments, the one or more full size images can be sent from the original image data source 164 to display node 100 by way of the control node 102. The full size images can include various types of data for visualization, such as still photographs, videos, or other images of anything including but without limitation, medical, satellite, geosciences, oil, weather monitoring or prediction, astronomy imagery, and include those discussed above with reference to FIG. 1. As those of skill in the art will recognize, the image types can vary greatly and be based on a variety of possible types of data.

Moving to block 220, a set of sub-images that allow for rapid access to portions of the one or more full size images can be created. In some embodiments, the image processing module 150 preprocesses each original full size image and creates a set of sub-images that are a reduced size version of the original image. These sub-images can also be referred to as "thumbnail" representations of the corresponding full resolution image. Further, the largest sub-image can be the same size as the original image and/or include image content from the original image.

For example, a sub-image can be formed from a cropped portion of the original image, at the same resolution of the original image. Additionally, such sub-images can be stretched to visually appear to cover approximately the same proportion of the corresponding nodes 100A, 100*b*, 100*c*, etc, when the entire original image is displayed on the array 100. The stretching may be performed by interpolating pixel values, for instance. These types of manipulation can be performed, for example, on the control node 102. Such a use of sub-images can help the control node 102, or any computer forming the present method, to operate faster (e.g., redraw the sub-image after it has been moved or stretched) because the control node 102 may not be required to redraw all of the pixels of the original image.

Moving to block 230, the set of sub-images can be stored in a preprocessed image data structure. In some embodiments, each sub-image can be stored in a hierarchical format, such that one or more blocks allow rapid access to a particular part of the image without having to access entire rows or columns. This hierarchical format can allow a display node 100A of the tiled system that knows the portion of an image it needs to display to fetch exactly the level of detail, for example a corresponding sub-image, and/or to quickly fetch the needed blocks that make up the image tile.

Figure 3:
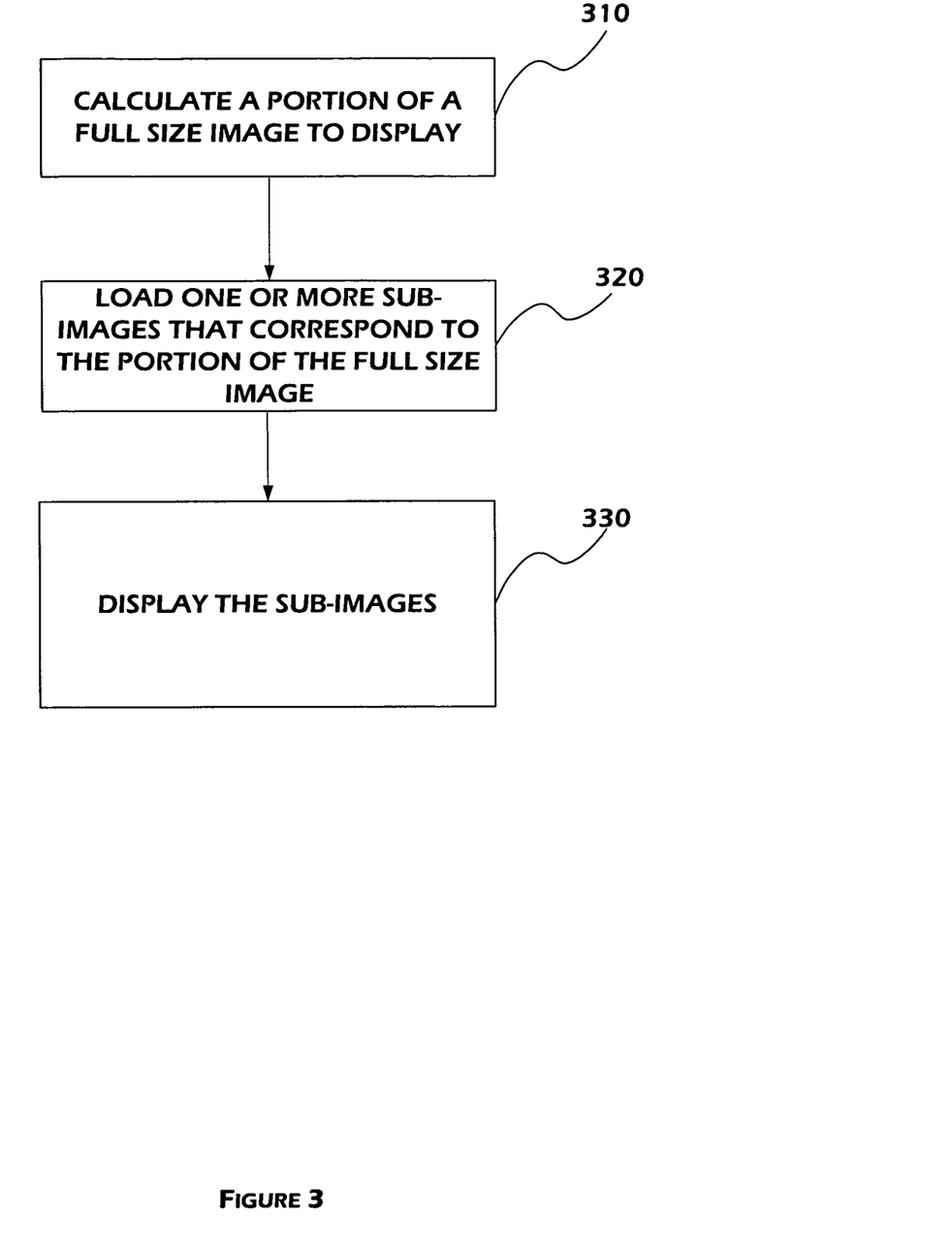
FIG. 3 is a flow chart illustrating another embodiment of a method for displaying an image on an array display.

FIG. 3 schematically illustrates an embodiment of another method of displaying and manipulating images on a tiled display system, such as the array 100. Depending on the embodiment, certain of the blocks described below may be removed, others may be added, and the sequence of the blocks may be altered.

Beginning in block 310, a portion of a full size image to display on a particular display node 100A can be calculated. Additionally, multiple portions of one or more full size images to display on the array 100 can also be calculated. Advantageously, this reduces the amount of data to be loaded on each particular display node 100, as well as a controlling computer, such as the control node 102, and thus increases the responsiveness of the overall tiled display and the control node 102. Because of the increased responsiveness, manipulation of images on the array 100 can be improved.

Moving to block 320, the one or more sub-images that correspond to the portion of the full size image to display are loaded into memory, for example. Because disk access times for loading a large full size image can be impractical, each display node 100A can load blocks of the appropriate sub-images needed for its local portion of the overall tiled display.

The correct portions of multiple full size images can also be loaded into memory of the corresponding display node 100A, 100B, 100C, etc.

Moving to block 330, the one or more sub-images can be displayed. In some embodiments, the display node 100A may render the sub-images resident in memory 130 using a multimedia device 140, such as a video card. The rendered sub-images can then be placed on display 166, such as a LCD monitor.

In some embodiments, one or more of the display nodes 100A, 100B, 100C, etc., can be configured to communicate and thereby receive image data directly from a video image source across a network, such as the original image data source 164 across the network 160, which as noted above, can be the Internet or another network, such as any local network.

In some embodiments, the control node 102, which can be considered a "primary workstation", can be configured to establish an initial connection between itself and the tiled display 100 and between itself and the original image data source 164. Additionally, the control node 102 can be configured to facilitate providing connections directly between the original image data source 164 and the tiled display, for example, directly with the display units 100A, 100B, 100C, etc.

Figure 4:
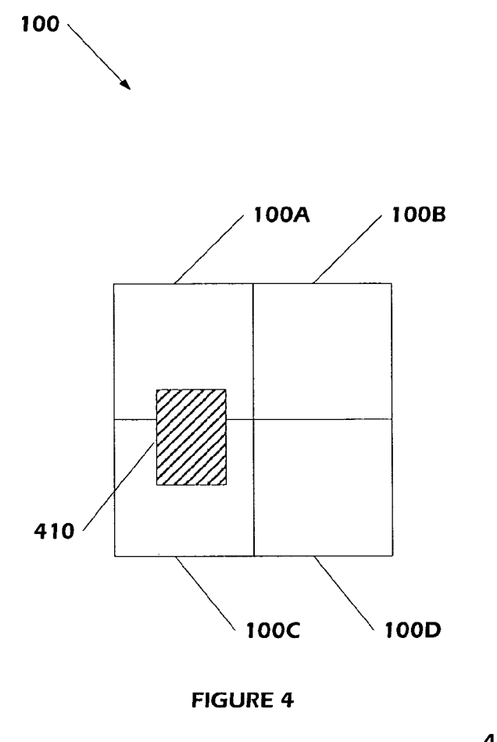
FIG. 4 schematically illustrates an image overlapping two display units in an array display.
Figure 5:
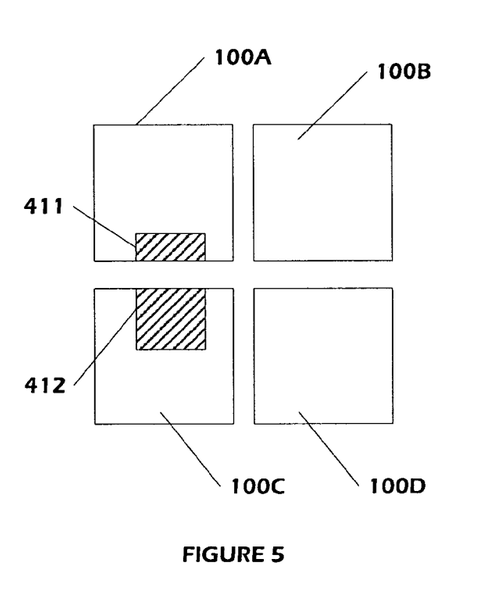
FIG. 5 schematically illustrates the image of FIG. 4 partitioned over two display units.

FIGS. 4 and 5 schematically depict how an image can be displayed on one or more display units 100A, 100B, 100C, 100D. As depicted in FIG. 4, a video image 410 can be displayed in such a manner that it overlaps two display units 100A and 100C. As further detailed in FIG. 5, if the array 100 is only displaying an image on a limited number of the total number of display units, such as only the units 100A and 100C, then the associated video image data from the source can be selectively sent to those display units 100A and 100C. This can help reduce bandwidth requirements for transmission of image data.

For example, with continued reference to FIGS. 4 and 5, the video image 410, when overlapping two display units, can be broken down into parts corresponding to those portions displayed on different units. As shown in FIG. 5, the image 410 can be segregated into a first portion 411 (displayed on display unit 100) and a second portion 412 (displayed on display unit 100C). As such, in some embodiments, the array 100 can be configured to send the video image data corresponding to the portion 411 to the display unit 100A and the other video image data corresponding to the portion 412 to the display unit 100C, along with data indicating the position at which these portions 411, 412 should be displayed.

As such, all of the video image data corresponding to the entire image 410 does not need to be sent to the other display units. Rather, in some embodiments, the array 100 can be configured to only send video image data to a display unit in the array 100, corresponding to the part of a video image being displayed on that corresponding display unit. This can greatly reduce the magnitude of data flowing into and out of the array 100, and more particularly, each of the display units 100A, 100B, 100C, 100 D. Additionally, such selective distribution or routing of data can further aid in reducing the magnitude of data flowing through each of the display units 100N and the associated network can be realized where an image being displayed on the array 100 is updated, such as when monitoring data, videos, etc.

Figure 6:
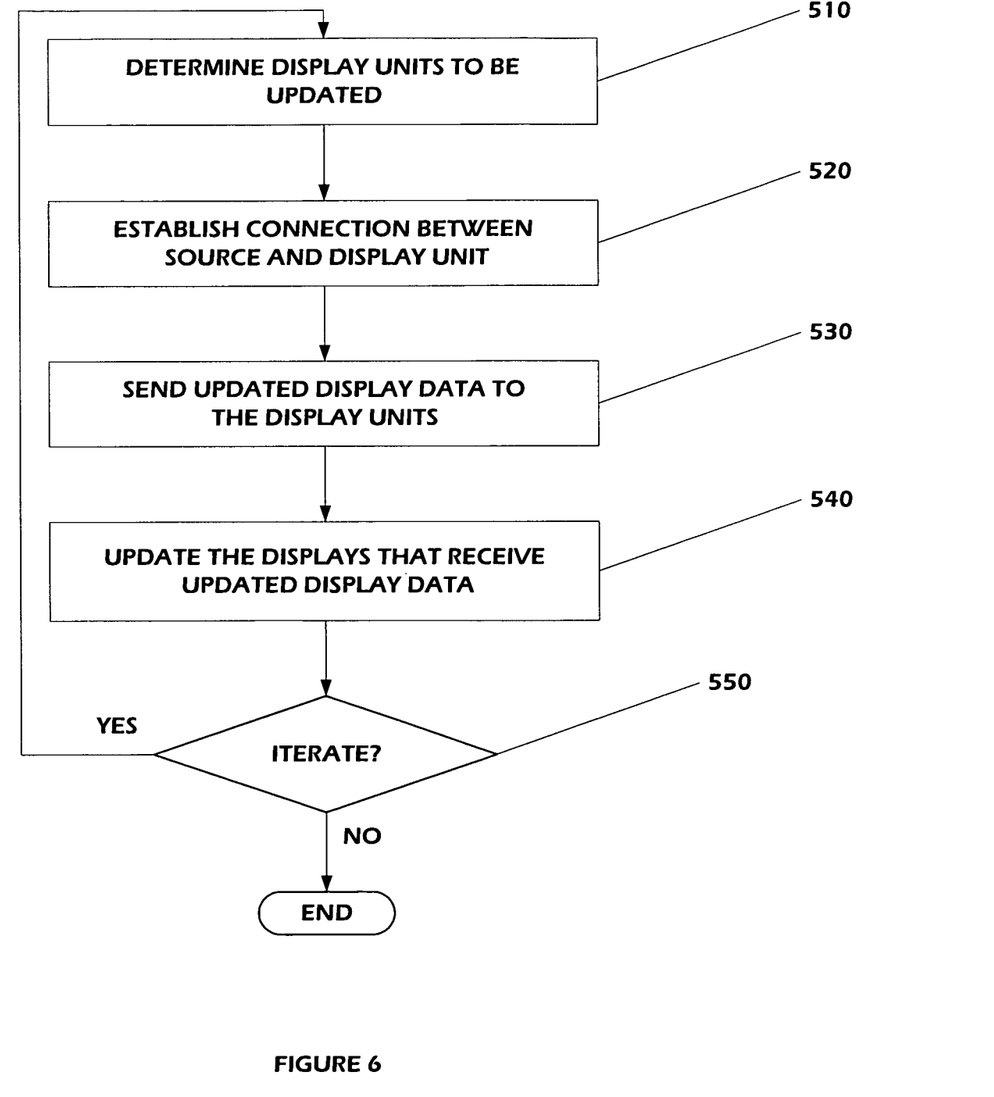
FIG. 6 is a flow chart illustrating embodiment of a method for updating an image on an array display.

For example, the array 100 can be configured to perform a method of updating, when it is desired to update the images displayed on the display units, such as the method schematically illustrated in FIG. 6.

FIG. 6 illustrates yet another control routine which can be included in the array 100 or in a system including the array 100. The control routine of FIG. 5 can begin with operation block 510. In the operation block 510, a determination can be made as to which display unit should receive the updated image data. In some embodiments, this determination can be made by the display units on which the corresponding image is displayed. In other embodiments, such as depicted in FIG. 1, a "workstation" or control node 102 may make this determination.

For example, the control node 102 can be configured to display images, such as the image 410 (FIG. 4) with a wire frame or other visual cues for representing the borders of the various displays 166 of each corresponding display unit on which the image 410 displayed, the same or similar to the schematic wire frame representations of the display units 100A, 100B, 100C, 100D illustrating FIGS. 4 in 5. The control node 102 can be further configured to allow a user to manipulate the placement of an image, such as the image 410, on the array 100. As such, the array 100, and in some embodiments the control node 102, can be configured to determine which of the display units will receive an update to the image 410 based upon onto which of the display units the image 410 extends.

In some embodiments, determining which portion of the display should receive updated data or images may be accomplished by querying the displays units currently displaying data or images from the original image data source 164. For example, if a display unit is already displaying data or images from the original image data source 164, then that display unit may be a candidate to receive updated display data or updated images. If displayed data or images move from one display unit to another, then any display unit from which data or images are moving and any display unit to which data or images are moving may be selected to receive updated display data are updated images.

After a determination is made in step 510 as to which display units should receive updated image data, then in step 520 a connection can be established between the original image data source 164 and each display unit 100A, 100B, 100C, etc., to which updated data is being sent.

For example, with reference to FIGS. 1-4, when data representing a full image or a portion of a larger image are sent to the display units 100A, 100B, data representing a location of the source of the image data can also be sent to the display units 100A, 100B. For example, when the data corresponding to the image portion 411 is sent to the display unit 100A, data identifying the source of the image portion 411 can also be sent to the display unit 100A.

In some embodiments, the data identifying the source can be a network address, such as an Internet Protocol (IP) address or the like. The IP address may be identified by a uniform resource identifier (URI), such as a uniform resource locator (URL). Additionally, the data identifying the source can include further location identifying information such as, for example but without limitation, file name, drive location, any passwords that may be required to access the image portion 411, port number, or any other data.

Further, the data identifying the source can also include a portion identifier or framing data which can include data identifying the portion of a full-size original image 410 corresponding to the portion 411. For example, the portion identifier can include a URL or the like representing a range of columns and rows of the image 410 corresponding to the portion 411. Thus, if the data identifying the source identifies the location of a full image, the display unit 100A can use the portion identifier data to access and download less than the full image. For example, the display unit 100A can be configured to download only the image data corresponding to the portion 411 from the original image data source 164. Other techniques can also be used.

A connection can be established between the one or more image data sources, such as the original image data source 164, and each display unit 100A, 100b, 100C, etc. Such connections can be established over a wired network, over a dedicated wire, over a wireless network, via infrared, or via any other communication mechanism.

In some embodiments, display units 100A, 100b, 100C, etc., of array 100 can be configured to "subscribe" to updates from the original image data source 164. In some embodiments, by subscribing for updates, a display unit can be configured to request a "subscription" for updates from original image data source 164 corresponding to images displayed on that display unit.

In some embodiments, establishing a subscription type of communication connection can include establishing a connection to the display unit or its corresponding control node using a reliable unicast connection to the display unit or its corresponding control node, a reliable network overlay topology, or establishing a broadcast on an unreliable multicast channel. An "unreliable" multicast channel with error checking and handling may also be used.

In some embodiments, a computer can be used to establish the initial connection between a display device and the tiled display. For example, as depicted in FIG. 1, the control node 102 can be used to establish initial connections between itself and a tiled display 100 and between itself and a display device 130 or 140.

After a connection is established in step 520, then in step 530, the updated display data is communicated to the target display units. As noted above, this communication can be over a reliable unicast connection, via a reliable network overlay topology, in an unreliable multicast channel with error checking and handling, or via any other appropriate communication mechanism. Display units that are not displaying data from the original image data source 164 can receive any updated display information such as data or images from the original image data source 164 or any other source.

In some embodiments, a second version of the updated video data, display data, or images can also be sent to the control node 102. As such, a user operating the control node 102 can be provided with a more accurate depiction of the content of the images displayed on the array 100. The second version of the updated video data can be a thumbnail or other version of the image data, such as the hierarchical versions of the images that can be stored in the processed image data source module 162.

For example, if the display device coupled directly to the control node 102 is displaying smaller versions of all of the data on tiled display 100, then a thumbnail or smaller version of an image update sent from the original image data source 164 can also be sent to control node 102 so that control node 102 can display a miniaturized version of some or all of the updated images that are being displayed on tiled display 100. This may be useful, for example, if the image or video to be displayed is larger than the monitor, memory, or other capacity of the control node 102 can handle.

Once the updated display data or images have been received at the display units 100A, 100b, 100C, etc., then the receiving display unit is updated in step 540 based upon the received data. The display units 100A, 100B, 100C, can be configured to update the displayed images or image portions by any of many known techniques.

In step 550, it is determined whether to iterate steps 510-540. Steps 510-540 can be repeated, for example, each time display data or images from the original image data source 164 are updated. If there are additional updates to be made, the control routine can loop back to step 510. The display units that are updated can change each iteration or cycle of the control routine. If there are no further updates, the control routine can end.

In some embodiments, once a connection is established between the original image data source 164 and the target display unit 100A or control node 102, that connection may be kept open for future updates to the display image or display data. Alternatively, a new connection may be established each time updated data needs to be displayed on a display unit. Such a technique can be used to provide updates where the original image is in the form of a spreadsheet containing data to be updated, a video player receiving a stream of frames or other data to create a moving picture, security camera images at a reduced frame rate, a window of an application, or any other type of image.

In some embodiments, updated display data or images may be encrypted. The encrypted data, when received, may be decrypted so that the displays can be updated with the then-decrypted data. In some embodiments, the updated display data or images may be compressed in order to use less network bandwidth or otherwise lower the communication burden. The compressed data, when received, may be decompressed, and the decompressed data may be used to update the display units. In some embodiments, data may be both encrypted and compressed before it is sent and decrypted and decompressed upon receipt. Any encryption, decryption, compression, and decompression algorithms may be used.

In some embodiments, a user event input device, such as a keyboard 150 or mouse 151 connected to control node 102, connected to any other image data source which is also connected to the network 160, or connected directly to any one of the display units 100A, 100B, 100C, etc., (also schematically represented in FIG. 1 as I/O devices and interfaces 110) can be used to interact with the images displayed on the array 100. Additionally, in some embodiments, the user event input device can be in the form of haptic input devices, Wii® remotes, or any other type of input device.

The image (e.g. image 410 in FIG. 4) being displayed on the array 100, can correspond to image data received, directly or indirectly, from a source disposed remotely from the array 100, such as an original image data source 164, or any other client connected to the array 100 over the network 160. In such situations, it can be advantageous to allow such user inputs to the array 100 to be transmitted back to the source of the image 410. As such, a user operating or monitoring the image source device on which the image 410 is stored, such as an original image data source 164, can receive updates and thus monitor the manipulation of the image 410 on the array 100 by other users.

Figure 7:
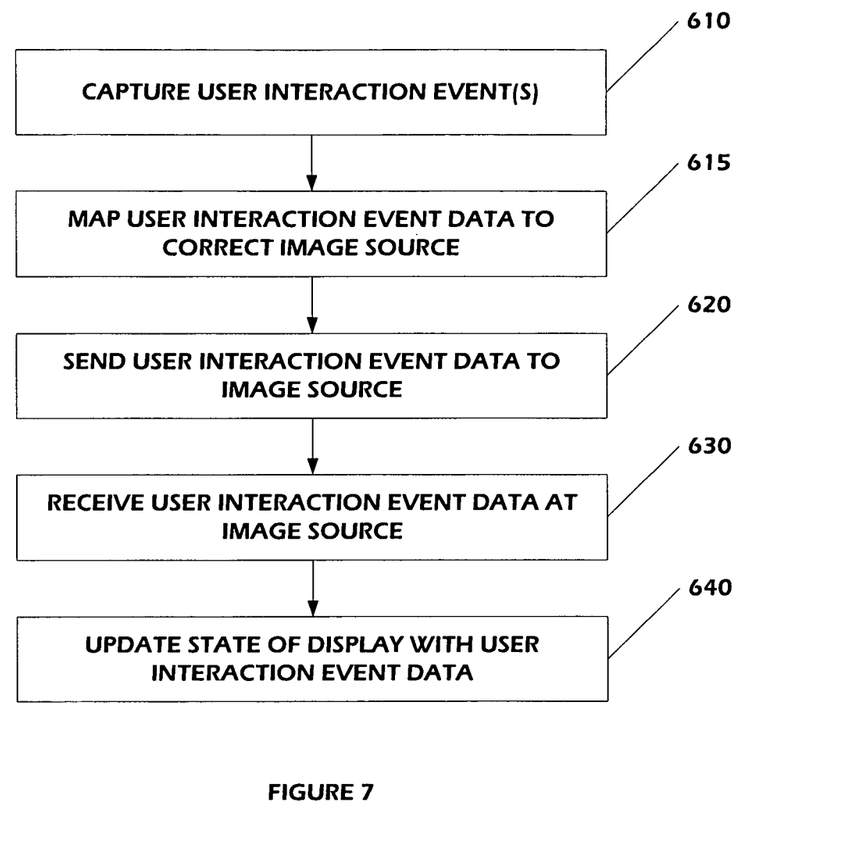
FIG. 7 is a flow chart illustrating embodiment of a method for processing user inputs regarding an array display.

FIG. 7 schematically illustrates a method that can be used to process such user interactions with an array 100. In step 610 of the block diagram of FIG. 7, user interaction events are captured. The user interaction event data may be captured by the control node 102, any of the display units 100A, 100B, 100C, etc., in the array 100, or a proxy of any of these display unit 100A, 100B, 100C, 102, etc. In some embodiments, the user interaction events correspond to a particular display unit 100A, 100B, 100C, etc.

In some modes, a mouse movement or keystroke may interact with a webpage, pixel, hyperlink, button, application window, sell, spreadsheet, documents, etc., displayed on one or more of the display units 100A, 100B, 100C, etc. For example, with reference to FIGS. 4 and 5, a user can perform a "mouse drag" in which an image 410 is dragged from one portion of the tiled display 100 to another portion. Additionally, the image 410 can overlap two or more display units, such as display units 100A, 100C as depicted in FIGS. 4 and 5. Of course, other actions can also be captured. For example, but without limitation, stretching, zooming, cropping, rotating, etc. of an image 410 can also be captured.

With continued reference to FIG. 7, after user interaction event data has been captured in step 610, then in step 615 the interaction event is mapped to the correct image source. In some embodiments, for example, the source of the image 410 can be the original image data source 164. In some embodiments, the control node 102 can be configured to determine which sources to send user interaction data based upon the position of the image 410 on the array 100. Additionally, in some embodiments, the individual display units 100A, 100B, 100C, etc., can determine which sources to send user interaction data based upon the source of the image 410 involved in the captured user interaction even data. For example, the individual display units 100A, 100B, 100C, etc., as noted above, can each display a plurality of images, each of which can arrive from different sources over the network 160. Thus, the display units 100A, 100B, 100C, etc., can determine to which source to send the captured user interaction data based upon which images are involved in the captured user interaction events.

In step 620, the captured user interaction even data is sent to the correct image source 410. After the user interaction event data is sent to the involved sources, such as the original image data source 164, the user interaction event data is received at the source in step 630. In some embodiments, the data sent in step 620 can be encrypted and/or compressed. As such, upon receipt of the user interaction event data it may be decrypted and/or decompressed.

After the user interaction event data is received at the source device in step 630, then in step 640 the state of the displaying device is updated. For example, if the display unit 100A sent user interaction event data to the original image data source 164, then the original image data source 164 can update the state of the display unit 100A based on the received user interaction data. For example, if the user interaction data is indicative of a mouse movement including dragging a window or "clicking" a hyperlink, then the display associated with the original image data source 164 can be updated with the associated hardware in the original image data source 164, to reflect the updated position of the window or the activation of the hyperlink. In some embodiments, the rest of the involved display units 100A, 100B, 100C, etc., can then be updated by the original image data source 164, as discussed above with reference to FIG. 5.

In addition the types of connections and couplings discussed above, any coupling or connection discussed herein could be a local area network, wireless local area network, wide area network, metropolitan area network, storage area network, system area network, server area network, small area network, campus area network, controller area network, cluster area network, personal area network, desk area network or any other type of network.

Any of the computers, laptops, server, including the proxy server, control nodes, workstation, or other devices herein may be any type of computer system. A computer system may include a bus or other communication mechanism for communicating information, and a processor coupled with bus for processing information. Computer system may also includes a main memory, such as a random access memory (RAM), flash memory, or other dynamic storage device, coupled to bus for storing information and instructions to be executed by processor. Main memory also may be used for storing temporary variables or other intermediate information during execution of instructions to be executed by processor. Computer system may further include a read only memory (ROM) or other static storage device coupled to a bus for storing static information and instructions for processor. A storage device, such as a magnetic disk, flash memory or optical disk, may be provided and coupled to bus for storing information and instructions.

The embodiments herein are related to the use of computer system for the techniques and functions described herein in a network system. In some embodiments, such techniques and functions are provided by a computer system in response to processor executing one or more sequences of one or more instructions contained in main memory. Such instructions may be read into main memory from another computer-readable storage medium, such as storage device. Execution of the sequences of instructions contained in main memory may cause a processor to perform the process steps described herein. In alternative embodiments, hard-wired circuitry may be used in place of or in combination with software instructions to implement embodiments. Thus, embodiments are not limited to any specific combination of hardware circuitry and software.

The term "computer-readable storage medium" as used herein, in addition to having its ordinary meaning, refers to any medium that participates in providing instructions to a processor for execution. Such a medium may take many forms, including but not limited to, non-volatile media and volatile media. Non-volatile media includes, for example, optical or magnetic disks, such as a storage device. Volatile media includes dynamic memory, such as main memory. Transmission media includes coaxial cables, copper wire and fiber optics, including the wires that comprise bus.

Common forms of computer-readable media include, for example, a floppy disk, a flexible disk, hard disk, magnetic tape, or any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge.

Computer systems can send messages and receive data, including program code, through the networks or other couplings. The received code may be executed by a processor as it is received, and/or stored in storage device, or other non-volatile storage for later execution.

In general, the word "module," as used herein, refers to logic embodied in hardware or firmware, or to a collection of software instructions, possibly having entry and exit points, written in a programming language, such as, for example, Java, Lua, Objective-C, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Although the foregoing description includes certain embodiments, other embodiments will be apparent to those of ordinary skill in the art from the disclosure herein. Moreover, the described embodiments have been presented by way of example only, and are not intended to limit the scope of the inventions. Indeed, the novel methods and systems described herein may be embodied in a variety of other forms without departing from the spirit thereof. Accordingly, other combinations, omissions, substitutions and modifications will be apparent to the skilled artisan in view of the disclosure herein. Thus, the present inventions are not intended to be limited by the disclosed embodiments.

What is claimed is:

1. A method of presenting video image data on an array of tiled display units, each of the tiled display units comprising a video display and a network communication module, a primary workstation communicating with the tiled display units over a network and at least a first video image data source connected to the network so as to communicate with the primary workstation and the tiled display units, the method comprising:
   transferring a first video image data from the at least one video image data source to the primary workstation;
   transferring the first video image data from the primary workstation to a first portion of the array of tiled display units, the first portion of the array of tiled display units comprising a first portion of a first video display of at least a first tiled display unit;
   creating a first communication connection between the network communication module of the first tiled display unit and the video image data source; and
   transferring a second video image data from the first video image data source over the communication connection to the first portion of the array of tiled display units, without all of the second video image data first passing through the primary workstation.

2. The method according to claim 1, wherein the step of transferring a second video image data comprises transferring all of the second video image data from the first video image data source to the first portion of the array of tiled display units.

3. The method according to claim 1, wherein the step of transferring the first video image data comprises transferring the first video image data to portions of at least first and second video displays of first and second of the plurality of tiled display units.

4. The method according to claim 1, additionally comprising transferring a third video image data from a second video image data source to a second portion of the array of tiled display units and creating a second communication connection between the second video image data source and the tiled display units onto which the second portion of the array of tiled display units extends.

5. The method according to claim 1, wherein the step of transferring the first video image data from the primary workstation comprises displaying the first video image data on the first portion of the first video display in a first display area.

6. The method according to claim 5, additionally comprising moving the first display area to a second position in the array of tiled display units and creating a second communication connection between the tiled display units associated with the second position and the first video image data source.

7. The method according to claim 6, additionally comprising transferring a second video image data from the first video image data source to the tiled display units associated with the second position over the second communication connection.

8. The method according to claim 1, additionally comprising transferring a second version of the second video image data to the primary workstation, wherein the second version of the second video image data is a thumbnail version of the second video image data transferred to the first portion of the array of tiled display units.

9. A method of displaying an image on a subset of an array of a plurality of connected displays to which a user computer is also connected, comprising:
   determining which of one or more connected displays, chosen from the plurality of displays connected to the user computer, should be sent updated image data;
   establishing communication between the one or more connected displays and an image data source remote from the user computer;
   receiving the updated image data at the one or more connected displays over the direct connections between the one or more displays and the image data source; and
   updating the one or more connected displays with the updated image data.

10. The method according to claim 9, wherein determining which one or more connected displays should be sent updated image data is performed by the user computer that is connected to the one or more connected displays and image data source.

11. The method according to claim 9, wherein the direct connection between the image data source and the one or more connected displays is established by a workstation that is connected to the plurality of connected displays and the image data source.

12. The method according to claim 11, wherein communicating the updated display data comprises sending the data directly from the image data source to the one or more displays without sending all of the updated image data to the workstation.

13. The method according to claim 9, wherein a second image data source is also connected to the one or more displays, the method further comprising:
   sending second image data from the second image data source to the one or more connected displays; and
   displaying the image data from both the image data source and the second image data source on the one or more connected displays.

14. The method according to claim 9, wherein an image corresponding to the updated image data is shown on two or more of the plurality of connected displays, the method further comprising sending the updated image data to the two or more displays.

15. The method according to claim 9, wherein a user interaction device is coupled to the user computer, and the method further comprising:
   collecting user event data from the user interaction device;
   communicating the user event data to the user computer; and
   updating a state of the user computer based on the user event data.

16. The method according to claim 15, wherein the updated display data is determined based on the updated state of the user computer.

17. A method of presenting data from a user computer to a subset of two or more connected displays to which the user computer is also connected, comprising:

determining which one or more connected displays, chosen from among the two or more connected displays, should receive updated display data from the user computer;

establishing a connection between the user computer and each of the one or more connected displays;

when data is generated at the user computer that affects display, receiving that display update only at the one or more connected displays; and when communicated data is received at the one or more connected displays, updating the one or more connected displays based on that data;

wherein determining which one or more connected displays should receive updated display data is performed by a workstation that is coupled to the one or more connected displays and the user computer.

18. The method according to claim 17, wherein the connection between the user computer and the one or more connected displays is established by a workstation that is coupled to the one or more connected displays and the user computer.

19. The method according to claim 18, wherein communicating the updated display data comprises sending the display data directly from the user computer to the one or more displays without sending the display data to the workstation.

20. The method according to claim 17, wherein a second user computer is also connected to the one or more connected displays and the method further comprises:

sending display data from the second user computer to the one or more connected displays; and displaying display data from both the user computer and the second user computer on the one or more connected displays.

21. The method according to claim 17, wherein the display from the user computer is shown on two or more connected displays and wherein the method further comprises, when the display data is updated, sending the updated data to the two or more displays.

22. The method according to claim 17, wherein a user interaction device is coupled to a control node, and wherein the method further comprises:

collecting user event data from the user interaction device;

communicating the user event data to the user computer; and updating a state of the user computer based on the user event data.

23. The method according to claim 22, wherein the updated display data is determined based on the updated state of the user computer.

24. A computer-implemented method of brokering media communications between computing devices, the method comprising:

receiving media with a control node from a media source device over a network, the control node comprising computer hardware;

transmitting the media from the control node to a destination computing device over the network; and programmatically providing network connectivity data from the control node to one or more of the destination computing device and the media source device, the network connectivity data operative to allow the destination computing device and the media source device to communicate without passing all communication through the control node.

25. The method of claim 24, wherein said programmatically providing network connectivity data comprises providing the network connectivity data to the destination computing device.

26. The method of claim 24, wherein said programmatically providing network connectivity data comprises providing the network connectivity data to the media source device.

27. The method of claim 24, wherein the network connectivity data is further operative to allow the destination computing device and the media source device to communicate without passing any communications through the control node.

28. The method of claim 24, wherein the destination computing device is configured to use the network connectivity data to request a media update from the media source device.

29. The method of claim 24, wherein the media source device is configured to use the network connectivity data to provide a media update to the destination computing device.

30. The method of claim 24, wherein the destination computing device is configured to report to the control node at least a portion of a media update received from the media source device.

31. The method of claim 30, wherein the at least a portion of the media update comprises one or more thumbnail images.

32. The method of claim 30, wherein the at least a portion of the media update comprises a video having a lower frame rate than a frame rate of the media update.

33. The method of claim 24, wherein the destination computing device is configured to report to the control node metadata associated with a media update received from the media source device.

34. The method of claim 24, wherein the destination computing device comprises a plurality of connected computing devices.

35. The method of claim 24, wherein the destination computing device comprises a plurality of connected displays.

* * * * *